(12) United States Patent
Hafez et al.

(10) Patent No.: US 7,339,578 B2
(45) Date of Patent: Mar. 4, 2008

(54) MULTI-LAYER TOUCH DISPLAY DEVICE COMPRISING ELECTROMAGNETIC ACTUATORS

(75) Inventors: Moustapha Hafez, Paris (FR); Jean-Marc Alexandre, Antony (FR); Mohamed Benali Khoudja, Antony (FR)

(73) Assignee: Commissariat A l'Energie Atomique, Paris (FR)

( * ) Notice: Subject to any disclaimer, the term of this patent is extended or adjusted under 35 U.S.C. 154(b) by 417 days.

(21) Appl. No.: 10/538,421

(22) PCT Filed: Dec. 4, 2003

(86) PCT No.: PCT/FR03/50152

§ 371 (c)(1),
(2), (4) Date: Jun. 9, 2005

(87) PCT Pub. No.: WO2004/055754

PCT Pub. Date: Jul. 1, 2004

(65) Prior Publication Data

US 2006/0012576 A1 Jan. 19, 2006

(30) Foreign Application Priority Data

Dec. 9, 2002 (FR) .................................. 02 15527

(51) Int. Cl.
*G09G 5/00* (2006.01)
(52) U.S. Cl. ...................................... 345/173; 715/701
(58) Field of Classification Search ................. 345/173; 715/701, 702; 178/18.01
See application file for complete search history.

(56) References Cited

U.S. PATENT DOCUMENTS

| 6,159,013 A | 12/2000 | Parienti |
| 7,106,220 B2 * | 9/2006 | Gourgey et al. ............... 341/27 |
| 2003/0151589 A1 * | 8/2003 | Bensen et al. ............... 345/156 |
| 2003/0179190 A1 * | 9/2003 | Franzen ...................... 345/173 |

FOREIGN PATENT DOCUMENTS

| EP | 0 012 803 | 7/1980 |
| GB | 2 181 591 | 4/1987 |
| JP | 3-129386 | 6/1991 |
| JP | 2002-351306 | 12/2002 |
| WO | 98/14860 | 4/1998 |

OTHER PUBLICATIONS

IBM Technical Disclosure Bulletin, "Thin Film Piezoelectric Vibrator Panel," vol. 34, No. 3, pp. 132-134, Aug. 1991.
International Search Report, for International Application No. PCT/FR03/50152, date mailed May 17, 2004.

* cited by examiner

*Primary Examiner*—Amare Mengistu
*Assistant Examiner*—Afroza Y Chowdhury
(74) *Attorney, Agent, or Firm*—Thelen Reid Brown Raysman & Steiner LLP

(57) ABSTRACT

A touch-sensitive display device (10) is characterized in that it is constituted by a stack of layers (1, 4), an insulating layer (2) comprising recesses (21) for the displacement of blades (12) connected to a touch plate (1) being positioned between the touch plate (1) and a layer (3) comprising pancake coils (31) that can be addressed selectively. By modifying the value of currents sent to the different coils (31), the feel of the touch plate (1) can be modified.

14 Claims, 7 Drawing Sheets

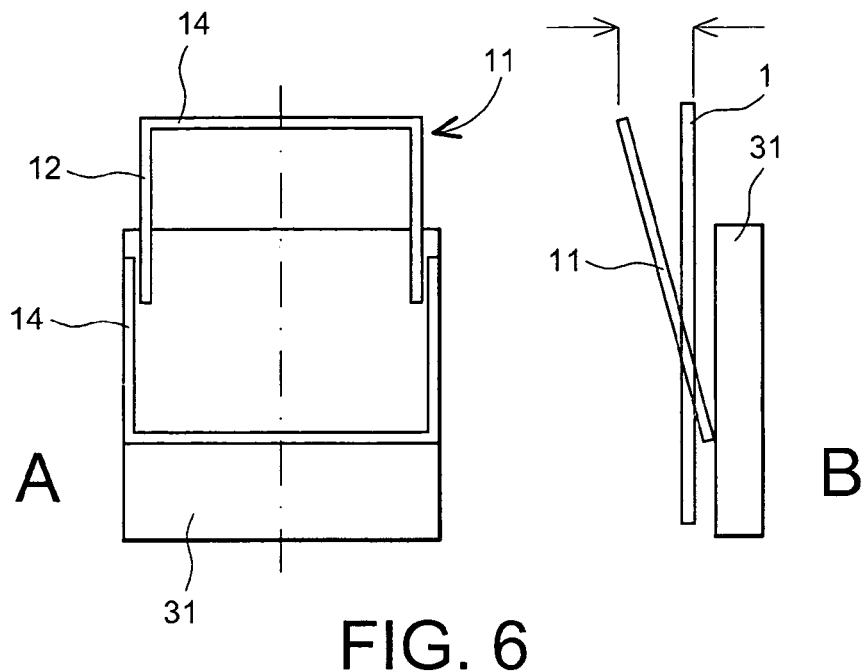
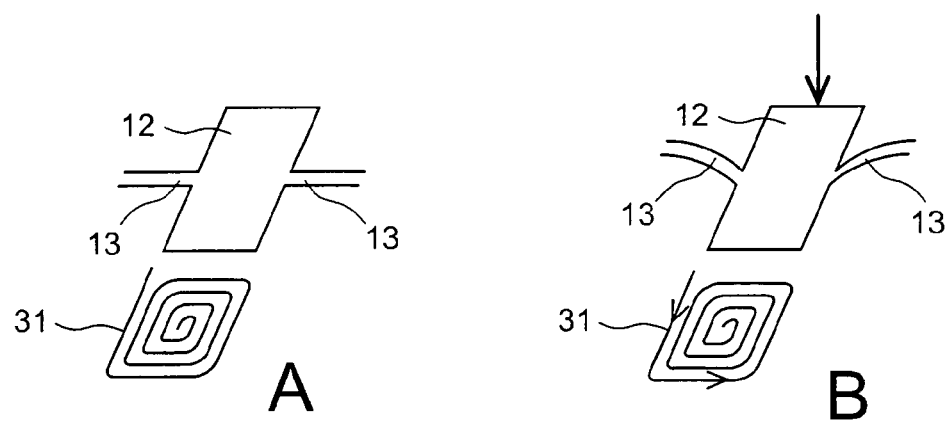
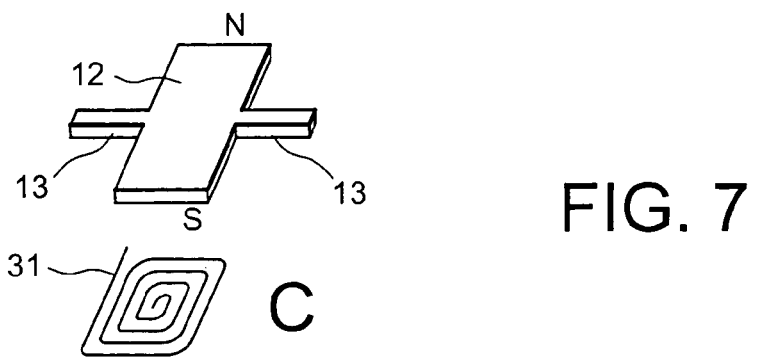
FIG. 6
FIG. 7

MULTI-LAYER TOUCH DISPLAY DEVICE COMPRISING ELECTROMAGNETIC ACTUATORS

CROSS-REFERENCE TO RELATED APPLICATION

This application claims priority based on International Patent Application No. PCT/FR2003/050152, entitled "Multi-Layer Touch Display Device Comprising Electromagnetic Actuators" by Moustapha Hafex, Jean-Marc Alexandre, and Mohamed Khoudja Benali, which claims priority of French Application No. 02/15527, filed on Dec. 9, 2002, and which was not published in English.

FIELD OF THE INVENTION

The invention is located in the field of devices intended to transmit touch-sensitive information to a user. It relates more particularly to a display device comprising:
 a touch plate with a touch-sensitive surface,
 a network of magnetic coils and a network of mobile parts for modifying the tactile sensation, the mobile parts being actuated as a function of currents flowing in the coils to produce on the touch-sensitive surface a tactile sensation which is a function of the currents flowing in each of the coils.
 an addressing circuit to address current selectively to the different coils of the micro-actuators.

The magnetic coils actuate the mobile parts, which then deform a part of the touch-sensitive surface or make it vibrate. When the raised part of the touch-sensitive surface is deformed, or made to vibrate, a tactile sensation is produced that can be detected by the user. The addressing circuit allows the selection of micro-actuators, which have to be actuated at a given time in order to produce at that moment the tactile sensation required.

DESCRIPTION OF THE PRIOR ART

U.S. Pat. No. 6,159,013 describes a portable optical sensor for the blind. The device includes an electromagnetic unit 1 shown in FIGS. 1 and 2 of this patent. The electromagnetic unit shown in more detail in FIG. 3 of this patent comprises a touch plate 22. This plate comprises holes 21. Mobile rods 19, centred on each of the holes 21, can, depending on their axial position, cause a deformation of a touch-sensitive surface 32 on the touch plate 22. Each of the rods 19 is placed locally perpendicular to the touch-sensitive surface 32. A coil 7 placed to the rear of the touch plate 22 surrounds each of the rods 19. The coil 7 allows each of the rods 19 to be displaced in its axial direction. Depending on the value of a current flowing in the coil 7, one end of the rod 19 extends beyond or does not extend beyond the corresponding hole 21, thus modifying the shape of the touch-sensitive surface 32. In this way, a particular tactile sensation on the touch plate can be controlled at any time. In this embodiment example, an optical device 4, 5 placed upstream of the touch-sensitive device allows a written page to be converted successively, character by character, into digital data that is able to be reconverted into touch-sensitive data, in the way that a Braille reader is able to distinguish a string of characters in a touch-sensitive way.

It will be understood that the device employed in the aforementioned US patent may be useful in terms of delivering character based information, but that it quickly proves ineffective if the number of actuators has to increase. For a device that may reach several hundred actuators the method described in this patent can no longer be applied by reason of the complexity of assembly and wiring, above all when the systems are to be miniaturised.

BRIEF DESCRIPTION OF THE INVENTION

The present invention proposes a touch-sensitive display device made by using the techniques of mass manufacture, particularly electrodischarge machining, laser scribing or microelectronics which can contain a great number of individual display components, each of which is able to be controlled individually, to form a display on a touch-sensitive surface.

The invention therefore relates to a touch-sensitive display device comprising:
 a touch plate with a touch-sensitive surface,
 a network of magnetic coils actuating mobile parts to modify the tactile sensation, as a function of currents flowing in said coils so as to produce on the touch-sensitive surface a tactile sensation which is a function of the different currents flowing in each of said coils,
 an addressing circuit to address currents selectively into the different coils,
 characterised in that:
 the touch plate comprises a monolithic network of tactile sensation modification components, each network component comprising the set of mobile parts, each mobile part being able to be displaced under the action of a magnetic field, each set of mobile parts of a network component being subject to the field produced by one or more coils of the network,
 the magnetic coil network is in the form of a monolithic layer,
 an intermediate insulating layer is placed between the monolithic layer of coils and the touch plate, this intermediate insulating layer comprising, opposite each of the tactile sensation modification components, a recess procuring a mobility space for said set of mobile parts of this component.

In one embodiment, the set of mobile parts of tactile sensation modification components is constituted by one or more blade(s) integral with the touch plate via one or more arms, and resulting from a local cut in the plate that releases the blade or blades. The cut may be presented in the form of one or more grooves passing through the plate, present over the whole perimeter of the blade except for a blade connection part, these through grooves leaving one or more remaining arms connecting the blade to the whole of the touch plate. Thus, generally speaking, one or more blade release grooves are present in one part of a perimeter of the blade.

In an alternative embodiment the touch plate is sufficiently thick and the mobile parts are constituted by blocks constituting a magnet that can move by sliding in a hole in the touch plate.

In one embodiment, the coils are pancake coils, formed by flat winding a conductive track and placed on an insulating medium that is placed parallel to the touch plate and to the intermediate insulating plate comprising the blade displacement recesses. According to one variant of this embodiment one coil, one recess and one tactile sensation modification component together constitute an individual display component. According to another variant of this embodiment a group of coils, one recess and one tactile sensation modification component together constitute an individual display component.

Preferably, in each of the embodiments the surface of a coil, or group of coils, corresponds substantially to the surface of the tactile sensation modification component actuated by this coil or group of coils.

In one embodiment, the addressing circuit is presented in the form of a printed circuit bearing tracks terminated with addressing contact pads, the contact pads coming into contact pads connection terminals of the coils. Electrical continuity between a coil connection terminal and the addressing contact pad of the addressing circuit corresponding to it can be ensured for example by pressing the contact pad against the terminal or by micro-welding a ball connection for example.

Thus in the embodiment which comprises at one and the same time the embodiment variant according to which the mobile blades are cut from the touch plate, the layer of pancake coils, and the addressing circuit in the form of a printed circuit, the display device according to the invention is presented in the form of a device made entirely by stacking layers parallel to each other according to the techniques of mass manufacture such as microelectronics. It then becomes possible to miniaturise to a high degree the tactile sensation modification components to produce a tactile sensation that is a clear improvement relative to known devices.

The addressing circuit can be made according to the methods for manufacturing mono- or multi-layer printed circuits.

Other advantages and characteristics of the invention will emerge from the following description of embodiment examples.

BRIEF DESCRIPTION OF THE DRAWINGS

Embodiments of the invention will now be described by means of the appended drawings, wherein:

FIG. 6 comprises parts A and B. Part A shows a plane view of a coil and blade constituting a tactile sensation modification component; part B shows the same components in a transverse cross-section, FIG. 7 comprises parts A to I. Each of these parts is intended to explain modes of operation of tactile sensation modification components, as a function of the nature of these components and of the currents applied to control coils.

DETAILED DISCLOSURE OF PARTICULAR EMBODIMENTS

Figure 1:
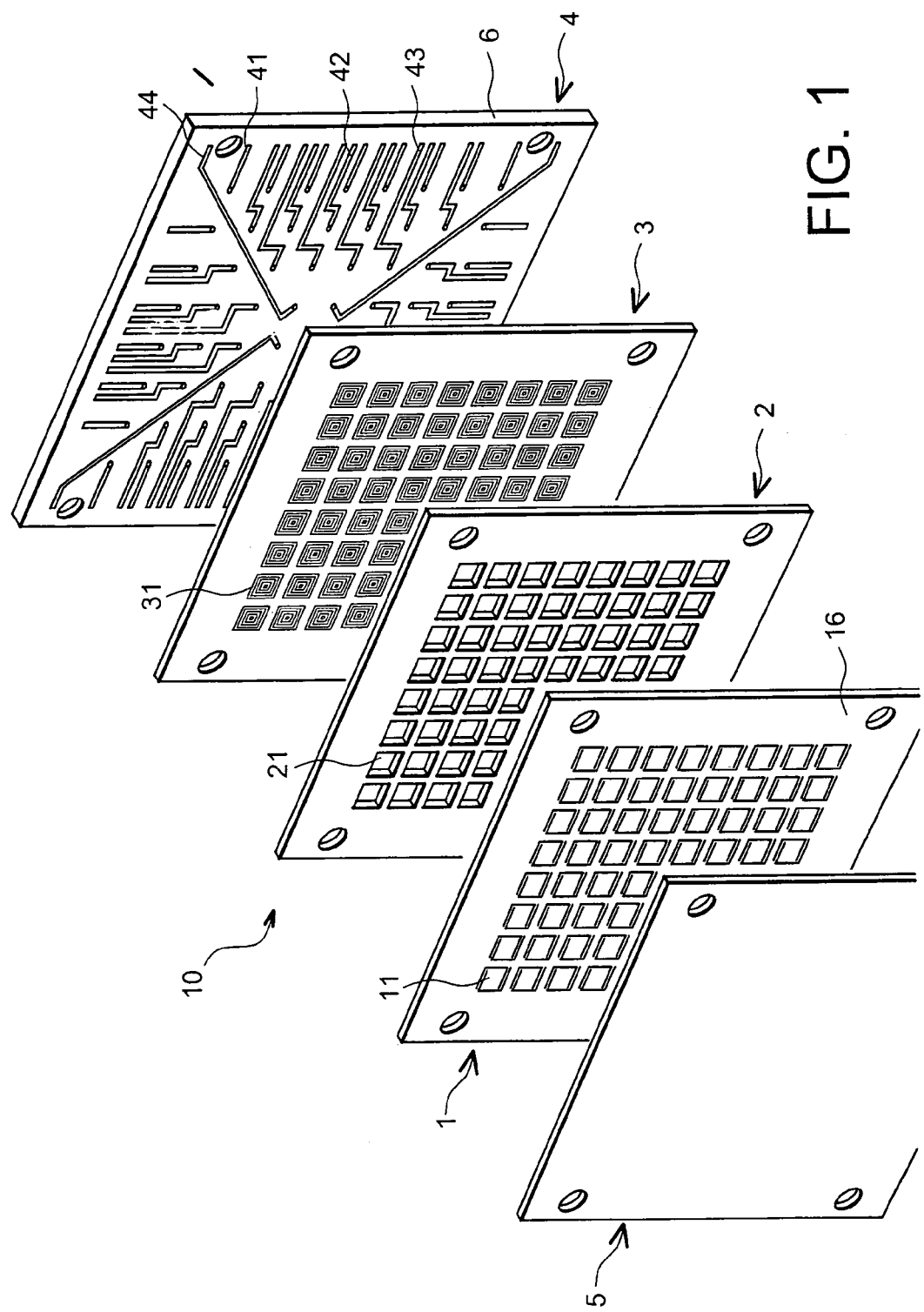
FIG. 1 shows an exploded perspective view of layers together constituting a display device according to the invention, FIG. 2 comprises parts A to H. Each of these parts shows an embodiment example of a tactile sensation modification component.

FIG. 1 shows an exploded view of different layers together constituting a touch-sensitive display according to the invention.

The display device 10 shown in FIG. 1 comprises a touch plate 1 with a touch-sensitive surface 16. It also comprises a layer 3 comprising pancake coils 31. It also comprises a printed addressing circuit 4. In the example shown in FIG. 1, this circuit is constituted by conductive tracks 41-43, laid out on an insulating substrate 6. Between the touch plate 1 and the layer 3 of coils 31 is placed in accordance with the invention an insulating intermediate layer 2, this layer comprises recesses 21 of which more will be said below. In the example shown in FIG. 1, the touch-sensitive surface 16 is coated with an external protective layer 5 of blades constituting components for modifying the tactile sensation felt in contact with the touch plate 1.

In the example shown, the layer 3 of coils 31 comprises eight lines, each of eight coils 31. The coils are formed in matrix networks.

Likewise, the insulating intermediate layer 2 comprises eight lines each of eight recesses 21. There is a one-to-one correspondence between a coil and a recess 21. In the example shown, each of the coils 31 is presented in the form of a conductive spiral in the shape of a square. Likewise, the recess 21 are presented as holes with the peripheral walls thereof forming a cylinder of square cross-section. It is thus possible to define for each of the coils 31 and for each of the recesses 21 a central axis of the coil, and a central axis of the recess 21. In the case shown in FIG. 1, the central axes are the axes locally perpendicular to the centre of a coil, or to the centre of a recess.

It is said that the central axes of the recesses and of the coils are locally perpendicular to the layer of coils and to the layer of recesses, because naturally, the different layers 1-4 together constituting a display device according to the invention, might not be plane, but take any shape, in particular any shape that can be obtained by deforming a plane layer. In every case, the different layers are locally parallel to each other.

In the example shown, the central axes of a coil 31 and of a tactile sensation modification component 11, coincide. This arrangement is not mandatory, and mainly depends on the shape of tactile sensation modification components 11, and on the mode in which these components are actuated. It will be seen below that in some embodiments, it is preferable to offset the central axes of the coils 31 and components 11. The important thing is that the recess 21 is able to allow the movement of mobile parts together constituting a tactile sensation modification component.

Figure 2:
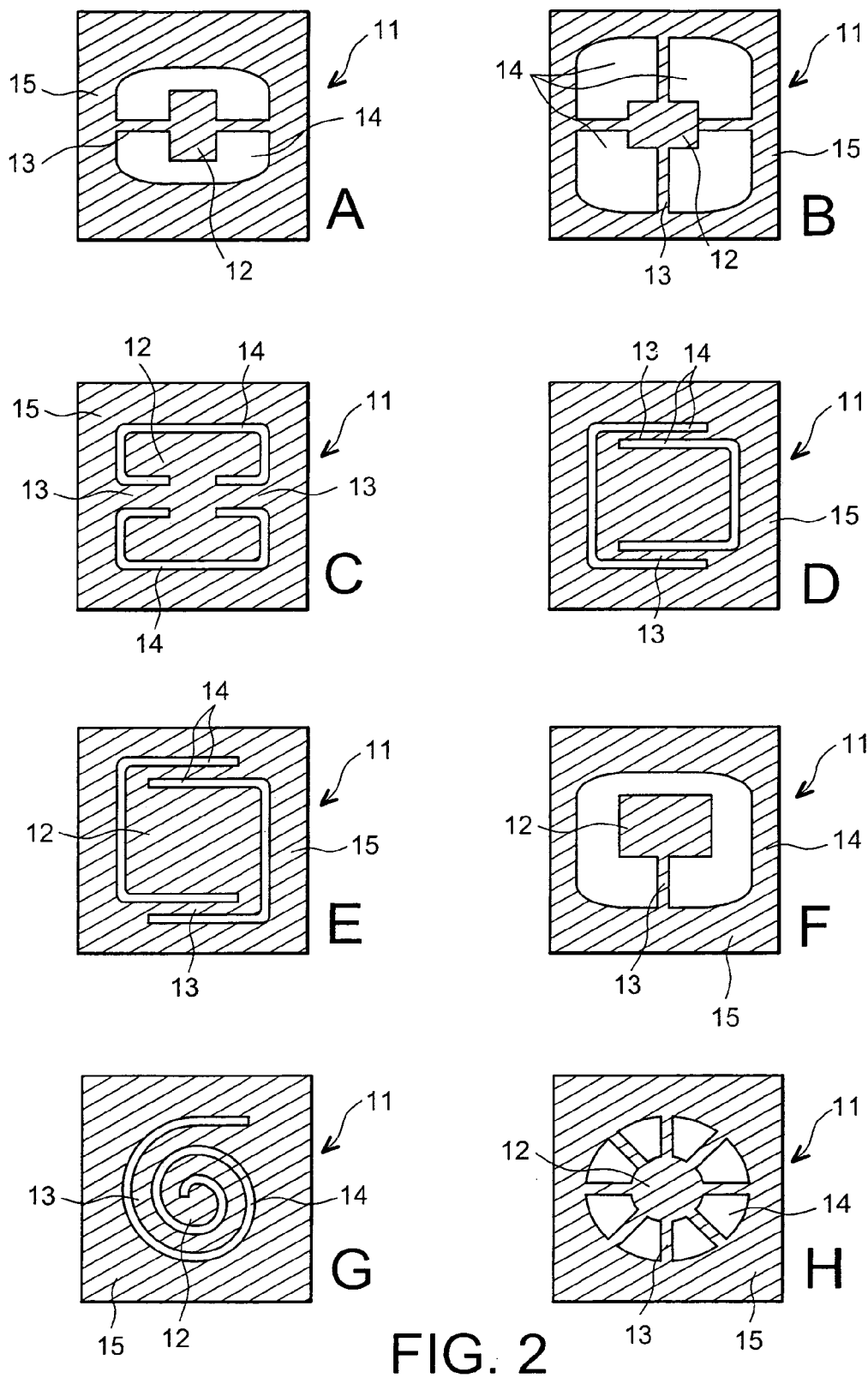

Embodiments of tactile sensation modification components 11 will now be commented on in connection with FIG. 2. This figure comprises eight embodiment examples of a tactile sensation modification component. These examples are identified in the figure from A to H.

In each of the examples shown, the tactile sensation modification component 11 is presented in the form of a rectangle 11. An inner peripheral part 15 of this rectangle comprises matter. This peripheral part is connected by one or more arms 13 to one or more blades 12. Groove 14 present in a central part of each rectangle 11, over a part of the perimeter of the arms 13 and of the blades 12 allow the blades 12 and the arms 13 to be released from the rest of the touch plate 1. The grooves 14 release the blade over its whole perimeter except at the places forming the junction zone between an arm 13 and the blade 12. Likewise, the grooves 14 release the arm or arms 13 over the whole of their perimeter(s) except for the places forming the junction zone between an arm 13 and the blade 12 at one of the ends of the arm 13 and between an arm 13 and the peripheral part 15 of the rectangle 11 at the other end of the two ends of the arm 13.

In the example shown in part A, a blade 12 is present in a central part of the rectangle 11. This blade is itself rectangular in shape, a first arm 13 connects a central part of one of the sides of the rectangle forming the blade 12 to the peripheral full part 15 of the rectangle 11. A second arm 13 joins symmetrically the opposite side of the rectangle 12 forming the blade 12 to the peripheral part 15 of the rectangle 11. In this way, the blade is connected to the rest of the touch plate 2 by two arms 13 aligned on one and the same axis.

The example shown in part B corresponds to a blade 12 located, as in the case shown in part A, in the central part of the rectangle 11. This time, the blade 12 is connected to the peripheral part 15 of the rectangle 11, by four arms 13 located 90° from each other. Each of the arms connects a central part of one side of the rectangle 12 constituting the blade 12 to the peripheral part 15 of the rectangle 11. In the example shown in part C, the blade 12 is rectangular in shape. This blade is separated from the rest of the rectangle 15, by the presence of a groove 14 having the shape of a cut groove 14 dug all around the blade 12, except for two parts forming junction zones of the arms 13 and of the blade 12. As shown in part C in FIG. 3, one part of the groove for releasing the blade 12 is contained inside the rectangle constituting the blade 12. In this way, the blade 12, is formed by two grooves symmetrical one with the other, each of the grooves being C-shaped. The arms 13 are constituted in this case by two tongues 13 symmetrical one with the other, and located between the two Cs.

In the example shown in part D in FIG. 2, the blade 12 is formed in a central part of the rectangle 11, by two channels 14 in the form of grooves each of which is U-shaped. Each of the Us is formed by a central part and two lateral parts perpendicular to the central part. The two lateral branches of a first U are located inside the second U. In this way, the arms are formed between the lateral parts of the first and second U.

In the example shown in part E, the central blade 12 is also formed by two U-shaped grooves 14. In this example a first U has one of its lateral parts located between the two lateral parts of the second U. The other of the lateral parts of the first U is located outside the two lateral parts of the second U. In this way, arms 13 are formed between the lateral parts of the first and second U.

In the example shown in part F, the blade 12 is formed by a C-shaped groove 14 entirely surrounding a central rectangular part forming the blade 12 except for the part 13 forming an arm joining the blade 12 to the peripheral part 15 of the rectangle 11.

In the example shown in part G, the blade 12 is in the shape of a spiral cut in the rectangle 11 by a groove 14 itself in the shape of a spiral.

In the example shown in part H, the blade 12 is circular in shape connected by arms 13 to the rest of the rectangle 11. This shape is obtained by removing material between two concentric circles forming grooves 14 in the form of parts of circular sectors. The arms 13 are formed by matter remaining between the grooves 14 in the form of parts of circular sectors.

It may be noted that in each of the examples shown in FIG. 2, the tactile sensation modification components 11 are presented in the form of a single blade 12, one part of the perimeter of which is released from the continuum of the touch plate 1, by grooves 14, in number equal to the number of arms 13 connecting the blade 12 to the continuum of the touch plate 1. In this way in the cases shown in parts F and G there is one connection arm 13 and only one groove 14. In the cases shown in parts A, C, D, E, there are two connection arms 13 and two grooves 14. Finally in the cases shown in figure B and H, there are four and eight connection arms 13 and four and eight grooves 14 respectively.

The examples of blades shown in FIG. 2 are given as examples, and are by no means restrictive. Each tactile sensation modification component has been shown by a rectangle 11, but it should be understood that the different rectangles 11 together composing the touch plate 1 are adjacent to one another, in such a way that the touch plate is presented as a continuum comprising grooves 14 releasing the blades 12, these blades being attached to the continuum by the arms 13. The touch plate is therefore a monolithic structure constituting an assembly of blades.

Figure 3:
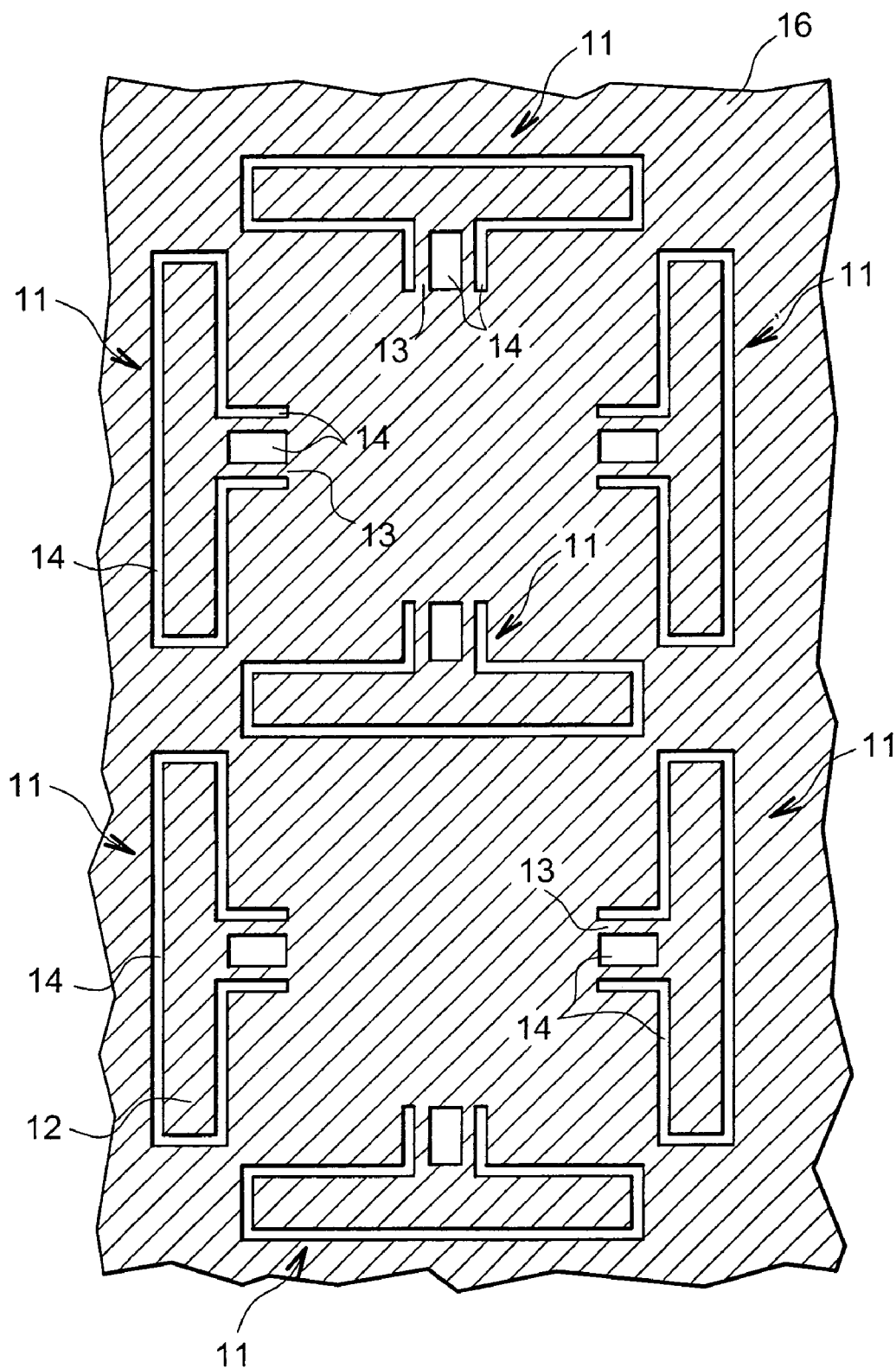
FIG. 3 shows a diagrammatic view from above of a group of tactile sensation modification components forming a 7-segments display.

Another mode of arranging the tactile sensation modification components 11 will now be commented on in connection with FIG. 3. In this embodiment, the tactile sensation modification components 11 are each presented in the form of a single blade, this blade being longilinear in shape in an axial direction, the blade being connected to the plate by two arms for example on one of the large sides of the rectangle, the components 11 being grouped on the plate in groups of 7 together forming a 7 segments display. FIG. 3 shows a view from above of one part of the touch plate 1 comprising a group of 7 tactile sensation modification components 11 together forming a 7 segment display. 7 segments displays of this kind are known per se for the display of alphanumerical signs. In this embodiment, the blades are longilinear in shape, for example rectangular. The blade remains integral with the continuum of the touch plate by means of two arms 13 connecting one of the long sides of the rectangle to the continuum of the plate. The arms 13 preferably connect the blade to the plate from the long side internal to the 7 segment display. A coil or a group of control coils 31 is provided for each of the blades, a set of seven coils or seven groups of coils each controlling one segment of a 7 segments display being addressable by a character generator also known per se. In the case of a group of coils for controlling a blade of a segment, the group is preferably composed of coils in the form of spirals appearing in a rectangular shape one of the sides of which has a dimension substantially equal to the width of the blade part located facing this coil. The coils of a group are preferably addressable simultaneously.

Figure 4:
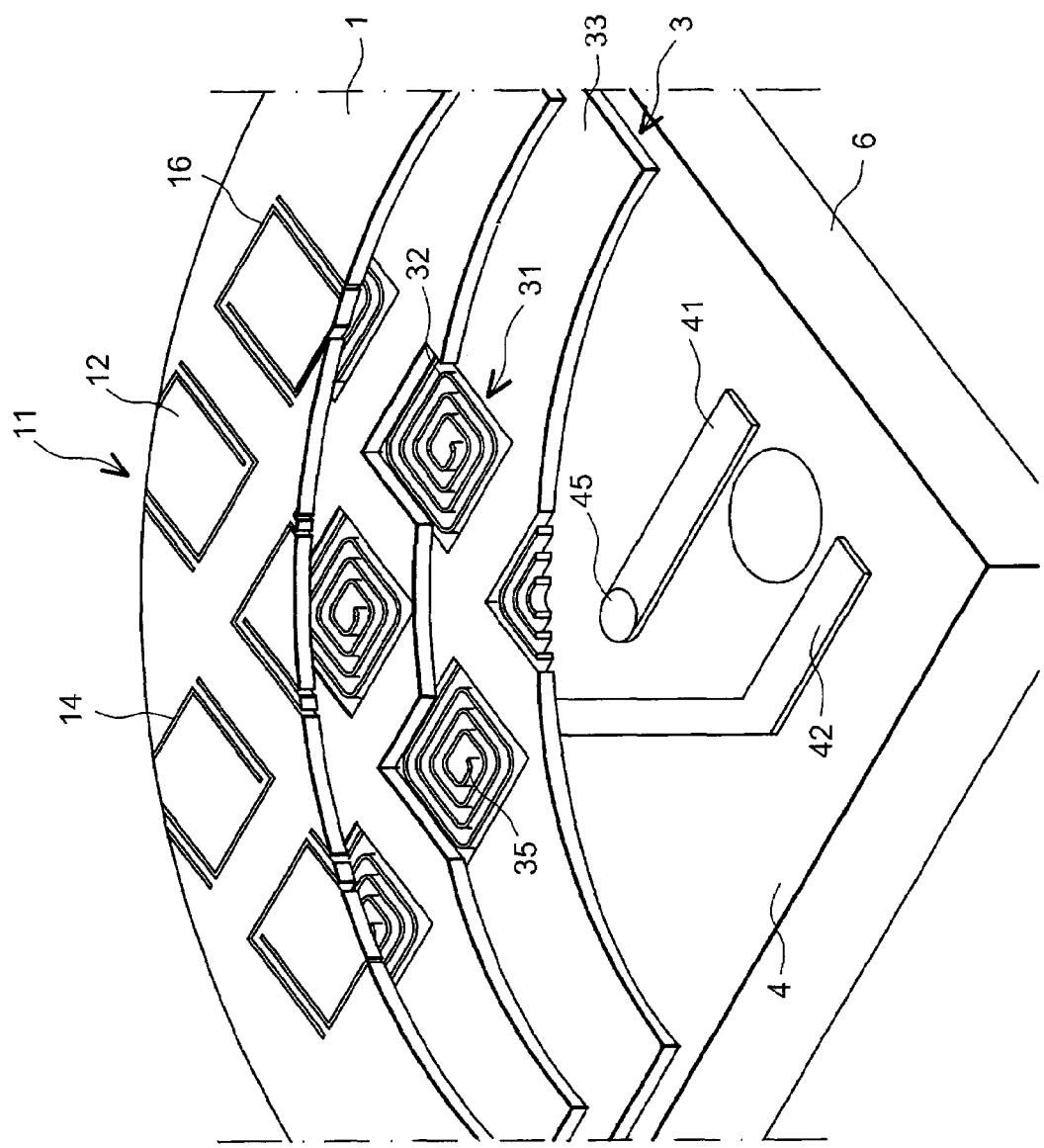
FIG. 4 shows an enlarged perspective view of four layers together constituting the main structure of a device according to the invention.

FIG. 4 shows a local enlarged view of FIG. 1.

This figure shows a part of the stack of layers together constituting a touch-sensitive display according to the invention.

The printed circuit layer 4 constituting the addressing circuit is mounted on a substrate 6. The layer 4 is constituted by an insulating medium on which are laid out conductive tracks 41, each joining an edge of the printed circuit at a track contact end 45 with an end of a coil 31 constituting one of the coils of the layer 3. In FIG. 4 two tracks 41 can be seen. One of the contact ends 45 of the track 31 with an end of a coil 31 can be seen, and the other is masked by the layer 3 of coils.

The layer 3 of coils 31, which is immediately above the layer 4, is constituted by an insulating medium 33 comprising a conductive track 32 in a spiral, each of the tracks constituting a pancake coil 31. Coil construction of this type is known per se and will not be described here. One end 35 of a conductive track 32 forming a coil 31, for example the central end of this track, is in contact with a contact end 45 of a conductive track 41 of the ;addressing circuit 4. Each track 41 of the addressing circuit addresses one coil 31, and only one, of the coil layer 3. In the example shown in connection with FIGS. 1 and 4, and as indicated above, the layer 3 of coils 31 comprises eight lines each of eight coils 31. The coils are formed in a matrix network. This arrangement is not mandatory. In particular in the case of tactile sensation modification components grouped to form 7 segment displays as shown in connection with FIG. 3, each coil or group of coils is preferably formed of one or more convolutions which appears (or appear) in a longilinear shape corresponding substantially to the shape of the blade controlled by this coil or this group of coils.

The locations of coils or groups of coils 31 are arranged in such a way that the magnetic field of a coil or a group of coils is strong in the mobile parts of a tactile sensation modification component, when for example a coil or group of coils faces a mobile part, for example a blade, or weak in the mobile parts not controlled by this coil or this group of coils.

The electrically insulating layer 2 comes immediately above the layer 3 of pancake coils 31. This layer comprises a set of recesses 21. In the example shown in FIG. 4, the surfaces of the tactile sensation modification components, the surfaces of the through recesses 21, substantially the surfaces of the coils 31 of the layer 3 are substantially equal to each other.

Finally the touch plate 1 constituted for example by a magnetic metal film comes immediately above the insulating layer 2 comprising the recesses 21. In the example shown, the blade 12 constituting each of the tactile sensation modification components complies with the example shown in FIG. 3, part E.

Figure 5:
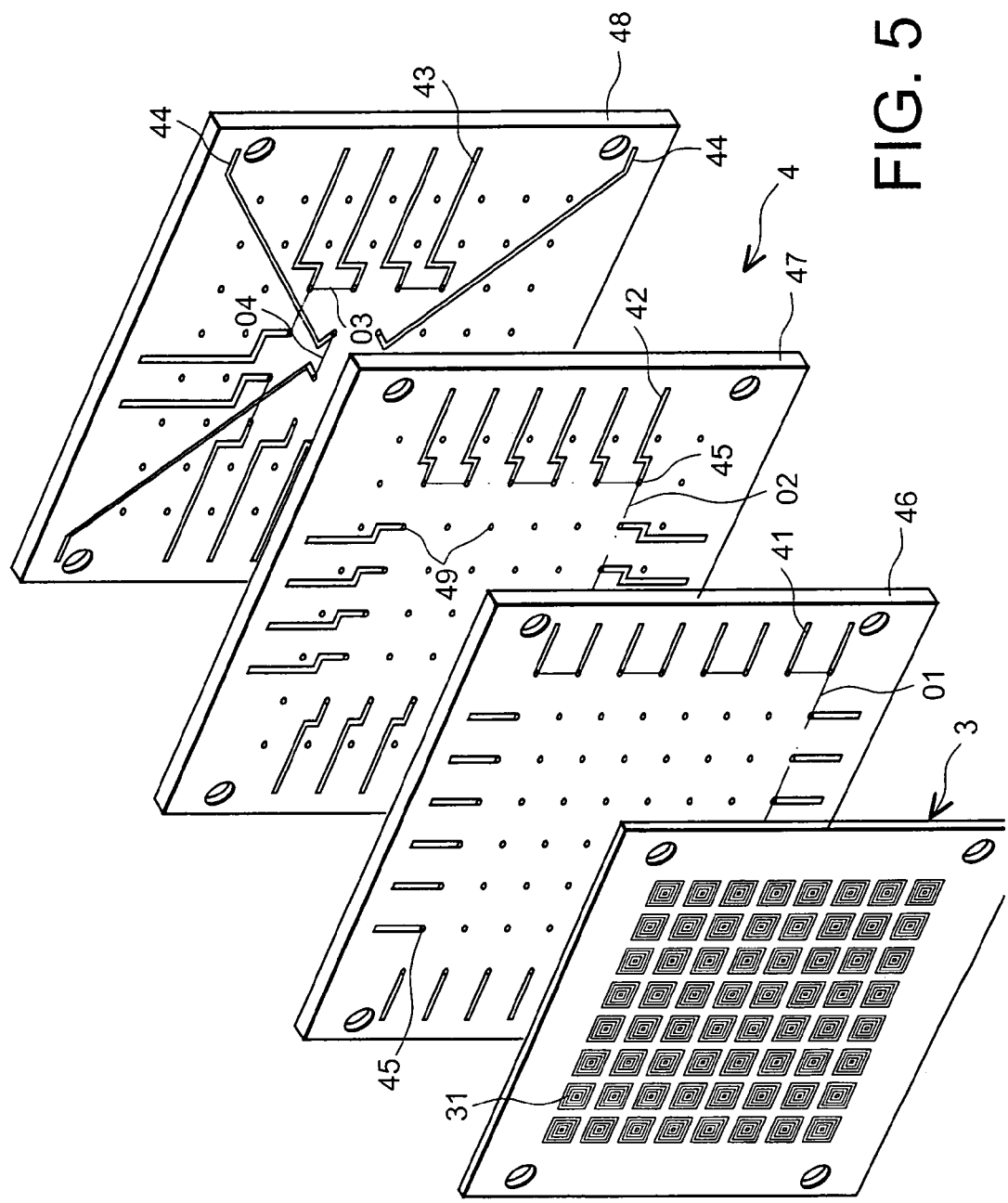
FIG. 5 shows in exploded perspective a layer of pancake coils and layers of a multi-layer printed circuit, these printed circuit layers together constituting a coil addressing circuit.

One embodiment of a printed circuit for addressing the coils will now be described in connection with FIG. 5. FIG. 5 shows an exploded view of a layer 3 of pancake coils 31 and of three layers 46-48 together forming a multi-layer printed addressing circuit 4. In this example, the layer of coils comprises eight columns of eight lines of coils 31. Addressing is carried out through the tracks 41-44 of the multi-layer circuit which come into contact with the centre of the coils. Each one can therefore be addressed independently. This configuration is of great advantage when the number of coils is very high. In the situation where the layer of coils comprises eight columns, eight lines, one monolayer circuit would be sufficient.

In the examples of addressing circuits shown in FIG. 1 or 5, there is a single addressing per coil. This assumes that an end of the convolution constituting the coil is connected to the earth, the second end constituting the addressing end.

Figure 7:
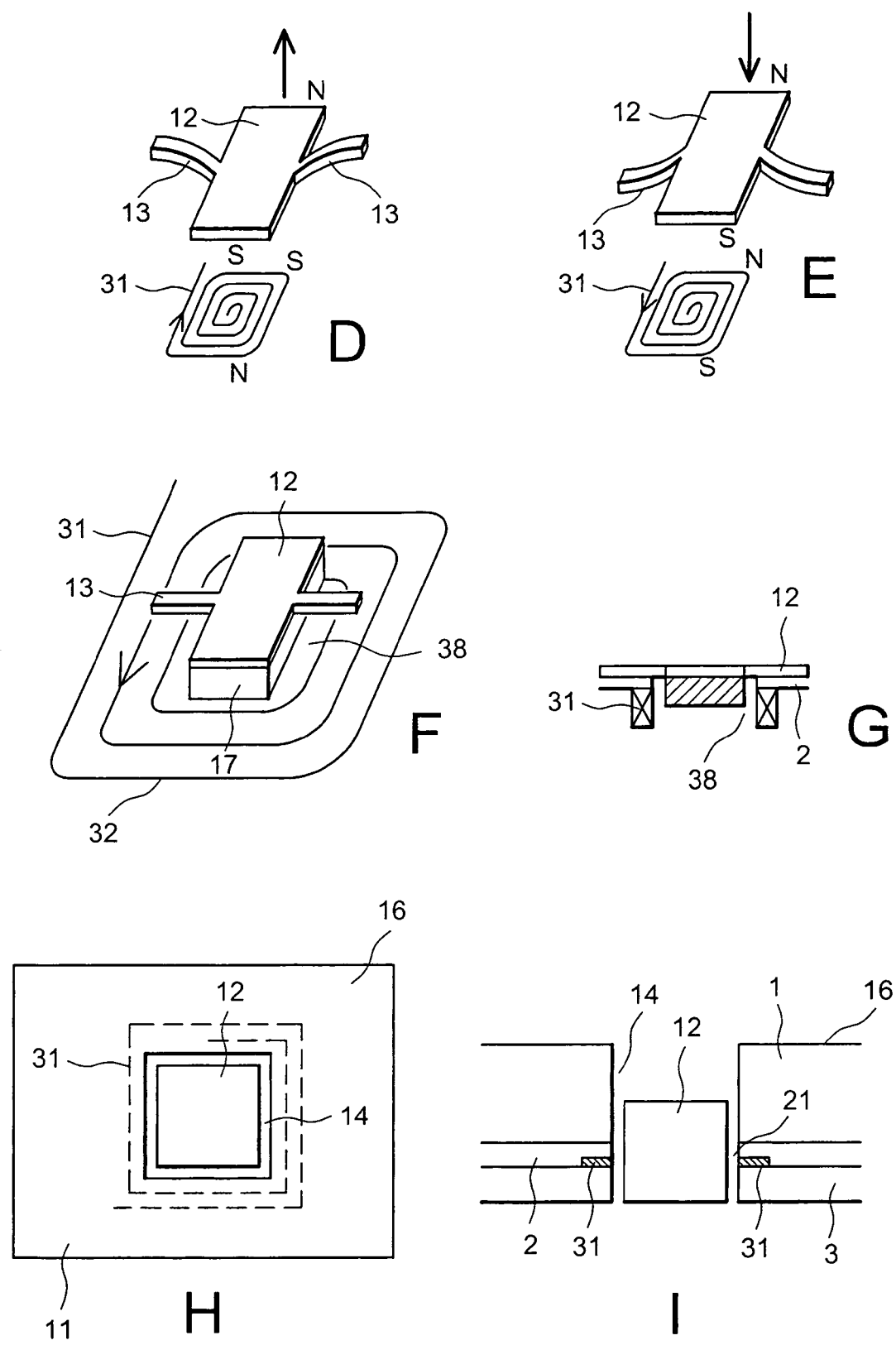

The different modes of operation of display devices as shown in connection with FIGS. 1 to 5 will now be commented upon in connection with FIGS. 6 and 7.

It is first of all specified that the blades 12 can be either made from a magnetic material, for example magnetic spring steel, or comprise layers which can be magnetised such as soft iron or a magnetic iron oxide or a rare earth, or again these blades can be fitted, for example by bonding, or attraction due to magnetic force, with a magnet.

When an alternating current is supplied to a pancake coil or a group of pancake coils 31, the blades, which constitute a tactile sensation modification component and which are in the field of this coil or this group of coils, are made to vibrate. The tactile sensation is thus modified as a function of the fact that the blades 12 vibrate or do not vibrate according to whether an alternating current passes through or does not pass through the pancake coil. The selective addressing of the coils, which is known per se and not commented upon here, thus allows a particular configuration to be given to the touch plate 1 as a whole.

An arrangement wherein an axis of a coil 31 is not aligned with an axis of a tactile sensation component 11, will now be commented upon in connection with FIG. 6. This figure comprises parts A and B. Part A shows in a view from above a coil 31, shown in the diagram by a square and a part of a touch plate 1 at the level of a tactile sensation component that has a form in which the blade is cut out by means of a groove 14 constituted by a double U as described in connection with FIG. 3 part D, the two lateral parts of one of the Us being partially inside the two lateral parts of the other U. As shown in FIG. 6, the outer cut U of a blade is found entirely above the coil 31. Conversely the inner U is found partially outside the coil 31. In part B, the same components are shown in transverse cross-section. When a direct current is applied to the coil 31, one part of the U is for example attracted towards the coil 31. In this way, the other part is lifted as shown in FIG. 6, part B. A sensation of embossing is thus obtained above the touch-sensitive surface 16 embodied by arrows in FIG. 6.

The force exerted by the coil or the group of coils can, depending on the relative layout of the blades and coils, cause deformation by twisting or bending.

Other embodiments and details about the embodiment as well as additional information about the materials potentially constituting a part of the tactile sensation modification components will now be commented upon in connection with FIG. 7.

FIG. 7 comprises parts A to I. Each of these parts is intended to explain operational modes of tactile sensation modification components, as a function of the nature of these components and of the currents applied to control coils.

Each of the parts A to I shows diagrammatically the form or position of a mobile part 12 located in the magnetic field of a coil 31 as a function of a direct current which is applied to this coil.

In the case shown in parts A and B, the mobile part is a blade 12 in a magnetic material or comprises layers of magnetic material. When no current is applied to the coil 31, the blade 12 is in a first off position, for example flush with the touch plate 1, as shown in part A. When a direct current is applied, as shown in part B, the blade 12 is attracted towards the coil 31 and is found in a second operative working position, creating for example a cavity sensation on the touch plate 1, and an impact sensation, in the case of an alternating current, due to the return force of the arm.

In the cases shown in C, D and E, the mobile part is a magnetic blade 12 constituted by a material forming a magnet or comprises connected magnets. In this case if there is no current flowing in the coil 31, as shown in part C, the blade is found in a first off position. On the contrary if a forward direction current as shown in part D, or reverse direction current as shown in part E, is applied to the coil 31 the blade is found in one of two operative working positions.

Parts F and G correspond to the case where the mobile part 12 is in the form of a blade 12 made in a very flexible material for example copper-beryllium or a spring steel, and where the magnet 17 is bonded under the blade. As regards the coil 31, it comprises a central channel 38 allowing the magnet 17 to be received. Part F is a perspective view of the blade 12 fitted with its magnet and part G is a transverse cross-section in which it can be seen that the magnet in an off-position, corresponding to the fact that the coil 31 is not being supplied, is partly inside the central channel 38 of the coil 31. Such an arrangement makes it possible to increase, the current being constant, the force generating the displacement of the blade constituting the tactile sensation modification component 11.

The case shown in parts H and I corresponds to the situation where the mobile part 12 is presented in the form of a block detached from the touch plate 1 and able to slide in a hole 14. Part H shows a view from above of a mobile part and of its coil and part I a transverse cross-section. Depending on the value of a current flowing in the coil 31, the part 12 emerges more or less from the touch plate 1, thus modifying the tactile sensation.

The layers constituting the device are not necessarily plane, but can on the contrary be adapted to different curves, for example on a portable structure like a glove used in virtual reality.

The invention claimed is:

1. Touch-sensitive display device (10) comprising:
   a touch plate (1) with a touch-sensitive surface,
   a network of magnetic coils (31) in the form of a monolithic layer actuating parts to modify the tactile sensation, as a function of currents flowing in said coils (31) so as to produce on the touch-sensitive surface (16) a tactile sensation which is a function of the different currents flowing in each of said coils (31), an intermediate layer (2) placed between the monolithic layer (3) of coils (31) and the touch plate (1), an addressing circuit to address currents selectively into the different coils (31), characterised in that:

the touch plate (1) comprises a monolithic network of tactile sensation modification components (11), constituted by a set of one or more blades (12) integral with the touch plate via one or more arms (13), one or more blade release grooves (14) being present around part of perimeter of the blade (12), each mobile blade being able to be displaced under the action of a magnetic field, each set of mobile blades (12) of a network component (11) being subject to the field produced by one or more coils (31) of the network, the intermediate layer (2) is insulant and comprises opposite each of the tactile sensation modification components (11), a recess (21) procuring a deformation space for said set of mobile blades (12) of this component (11).

2. Touch-sensitive display device (10) according to claim 1 characterised in that, the tactile sensation modification components (11) are presented in the form of a single blade (12), one part of the perimeter of which is released from the continuum of the touch plate (1), by grooves (14), in number equal to the number of arms (13) connecting the blade (12) to the continuum of the touch plate (1).

3. Touch-sensitive display device (10) according to claim 2 characterised in that, the mobile parts (12) comprise a block constituting a magnet that can move by sliding in a hole (14) of the touch plate.

4. Touch-sensitive display device (10) according to claim 1 characterised in that, the tactile sensation modification components (11) are each presented in the form of a single blade (12), this blade (12) being longilinear in shape in an axial direction, the blade (12) being separated from the continuum of the plate (1) by grooves (14) edging a central part of the blade (12) on either side of edges of the blade (12) substantially parallel to the axial direction, the components (11) being grouped on the plate in groups of 7 together forming a 7 segment display.

5. Touch-sensitive display device (10) according to claim 4 characterised in that blades (12) of 7 segments displays are each integral with the continuum of the touch plate by means of two arms (13) connecting the blade (12) to the continuum of the touch plate (1).

6. Touch-sensitive display device (10) according to claim 5 characterised in that blades (12) of a segment face a group of coils (31) of the layer of coils (3), the coils of a group being in the form of spirals inscribed in a rectangular shape.

7. Touch-sensitive display device (10) according to claim 4 characterised in that blades (12) of a segment face a group of coils (31) of the layer of coils (3), the coils of a group being in the form of spirals inscribed in a rectangular shape.

8. Touch-sensitive display device (10) according to claim 1 characterised in that mobile parts (12) are made of a magnetic material or comprise layers of magnetic material.

9. Touch-sensitive display device (10) according to claim 1 characterised in that blades comprise layers constituting a magnet or comprise a magnet fixed to the blade.

10. Touch-sensitive display device (10) according to claim 1 characterised in that mobile parts (12) comprise a magnet (17), in that coils (31) comprise a central channel (38), the magnet (17) of a mobile part (12) being housed in an off-position corresponding to the fact that the coil (31) is not supplied with current, at least partly in said central channel (38) of the coil (31).

11. Touch-sensitive display device (10) according to claim 1 characterised in that, the coils (31) are pancake coils placed on a layer (3) placed parallel to the touch plate (1) and to the intermediate insulating layer (2), in such a way that one coil (31), one recess (21) and one tactile sensation modification component (11) together constitute an individual display component.

12. Touch-sensitive display device (10) according to claim 1 characterised in that, the coils (31) are pancake coils placed on a layer (3) placed parallel to the touch plate (1) and to the intermediate insulating layer (2), in such a way that one group of simultaneously addressable coils (31), one recess (21) and one tactile sensation modification component (11) together constitute an individual display component.

13. Touch-sensitive display device (10) according to claim 1 characterised in that, the addressing circuit (4) is presented in the form of a printed circuit (4) bearing tracks (41-44) terminated with addressing contact pads (45), the contact pads (45) coming into contact with connection terminals (35) of the coils (31).

14. Touch-sensitive display device (10) according to claim 1 characterised in that it is constituted in the form of a stack of parallel layers (1-5), and comprising in addition to the touch-sensitive surface (1) and the intermediate insulating layer (2), a layer of pancake coils (31) each constituted by a plane convolution of a conductive track (32), placed on an insulating medium (33) the planes of the coils (31) on the insulating medium (33) being parallel to the planes of the other layers (1-5), the addressing circuit (4) itself being in the form of a flat circuit comprising tracks (41-44) terminated with addressing contact pads (45), the contact pads coming into contact with connection terminals (35) of the coils (31), the different components carried by the layers being placed in such a way that a coil or a group of coils (31), a recess (21) allowing the displacement of the mobile blades (12), and a mobile blade (12) are aligned in a direction substantially perpendicular to the plane of the layers.

* * * * *